United States Patent Office 3,279,880
Patented Oct. 18, 1966

3,279,880
POLYESTER TEXTILE MATERIAL DYED WITH
1-HYDROXY-4-N - p - (2'-PYRROLIDONYL-1-)
PHENYL-AMINO ANTHRAQUINONES
James M. Straley and David J. Wallace, both of Kingsport, Tenn., assignors to Eastman Kodak Company, Rochester, N.Y., a corporation of New Jersey
No Drawing. Filed July 12, 1965, Ser. No. 471,428
8 Claims. (Cl. 8—39)

This application is a continuation-in-part of our U.S. application Serial No. 198,766 filed May 31, 1962, now U.S. Patent 3,201,415 granted August 17, 1965.

This invention relates to new anthraquinone compounds, their preparation and their application to the art of dyeing or coloring.

The dyeing of linear aromatic polyester textile materials such as polyethylene terephthalate has presented difficulties. While it is known that water insoluble disperse dyes employed for the dyeing of cellulose acetate sometimes possess affinity for linear aromatic polyester textile materials, by far the majority of the known disperse dyes for cellulose acetate exhibit poor fastness to light when applied to linear aromatic polyester textile materials. The new water insoluble anthraquinone compounds of our invention possess good affinity for linear aromatic polyester textile materials and give violet to blue dyeings thereon having excellent fastness properties including excellent fastness to light. They have but limited affinity for cellulose acetate.

Linear aromatic polyester fabrics are usually heat set after dyeing at temperatures which often reach 375° F. to 400° F. If the dye is not fast to sublimation it will be removed in part at least from the goods during this operation. Some dyes otherwise suitable for dyeing linear aromatic polyester fabrics are unsuitable because they are not fast to sublimation. The new anthraquinone compounds of our invention yield dyeings on linear aromatic polyester textile materials which have excellent fastness to sublimation.

It is an object of our invention to provide new anthraquinone compounds. Another object is to provide a satisfactory process for the preparation of our new arthraquinone compounds. A further object is to provide dyed linear aromatic polyester textile materials which have good to excellent fastness properties.

We have discovered that the new anthraquinone compounds having the formula:

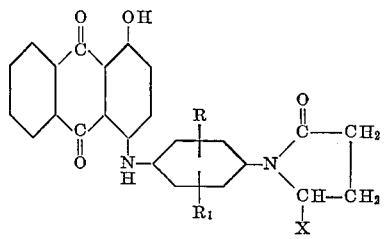

wherein R, $R_1$ and X each represents a hydrogen atom or a lower alkyl group of 1 to 4 carbon atoms, are valuable dyes for linear aromatic polyester textile materials. They have good affinity for the aforesaid polyester textile materials and give violet to blue dyeings thereon which have excellent fastness, for example, to light, washing and sublimation. The dyeings obtained are particularly distinguished by their resistance to dry sublimation at 300° F. to 400° F.

The new anthraquinone compounds of our invention are prepared by reacting a N-(p-aminophenyl)pyrrolidone having the formula:

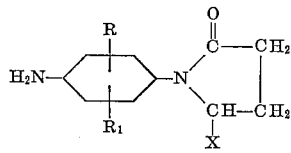

wherein R, $R_1$ and X each represents a hydrogen atom or a lower alkyl group of 1 to 4 carbon atoms with a mixture of 1,4-dihydroxyanthraquinone and leuco-1,4-dihydroxyanthraquinone. The reaction can be carried out using leuco 1,4-dihydroxyanthraquinone alone, but the use of a mixture of 1,4-dihydroxyanthraquinone and leuco 1,4-dihydroxyanthraquinone is preferred. Advantageously, the reaction is carried out in the presence of a neutral inert organic solvent for the reactants employed. Isopropyl alcohol, n-butyl alcohol, ethyleneglycol monomethyl ether, ethyleneglycol monoethyl ether, ethyleneglycol mono n-propyl ether, ethyleneglycol mono n-butyl ether, ethyleneglycol monoethyl ether acetate, diethyleneglycol and toluene are illustrative of the solvents in which the reaction can be carried out.

The linear aromatic polyester textile materials that can be dyed with the new anthraquinone compounds of our invention include polyethylene terephthalate textile materials obtained, for example, as described in U.S. Patent 2,465,319 patented March 22, 1949, or other polyester textile materials formed from analogous fiber-forming linear polyesters, such as polyesters derived from p,p'-diphenylsulfonedicarboxylic acid and various aliphatic acids and glycols as described in U.S. Patent 2,744,088 patented May 1, 1956, and polyesters derived from various acids, such as terephthalic acid and 1,4-cyclohexanedimethanol (1,4-dimethylolcyclohexane) as described in Kibler, Bell and Smith U.S. Patent 2,901,466.

The polyethylene terephthalate fibers sold on the market under the E. I. du Pont de Nemours and Company trademark "Dacron" and the polyester fibers sold at the market under the Eastman Kodak Company trademarks "Kodel" are illustrative of the polyester textile materials that can be dyed with the new anthraquinone compounds of our invention. These fibers are more particularly described in U.S. Patent 2,465,319 and 2,901,466, respectively. The polyester textile materials specifically referred to hereinbefore are linear aromatic polyesters having a melting point of at least 200° C. Linear aromatic polyesters having a lower melting point than 200° C. can also be dyed or colored with the new anthraquinone compounds of our invention.

The following examples illustrate our invention.

*Example 1*

A mixture of 10.5 grams of 1,4-dihydroxyanthraquinone, 6.5 grams of leuco 1,4-dihydroxyanthraquinone, 4 grams of boric acid, 15 grams of N-(p-aminophenyl)pyrrolidone and 200 cc. of isopropyl alcohol was refluxed together, with stirring, for 20 hours. The reaction mixture resulting was cooled and 100 cc. of water were added, with stirring. After one hour of stirring the solid which precipitated was recovered by filtration and washed well with water. The filter cake was reslurried in 3000 cc. of 7% aqueous sodium hydroxide and the resulting mixture was heated to boiling over a period of 40 minutes and then boiled 5 minutes. The dye compound formed was collected by filtering the hot reaction mixture and the dye cake was washed with water until the filtrate became colorless. The dye compound obtained has the formula:

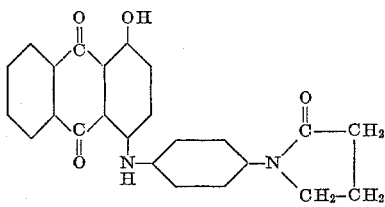

It is a blue solid having excellent affinity for linear aromatic polyester textile materials. It dyes these textile materials blue shades having excellent fastness to light, washing and sublimation.

*Example 2*

Example 1 was repeated using 15.7 grams of N-(4'-amino-3'-methyl)-phenylpyrrolidone instead of N-(p-aminophenyl)pyrrolidone. The dye compound obtained has the formula:

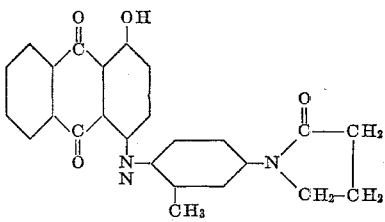

It dyes polyester textile materials blue shades which have excellent fastness to light, washing and sublimation.

*Example 3*

Example 1 was repeated using 15.7 grams of N-(p-aminophenyl)-5-methyl-2-pyrrolidone in place of N-(p-aminophenyl)pyrrolidone. The dye compound obtained has the formula:

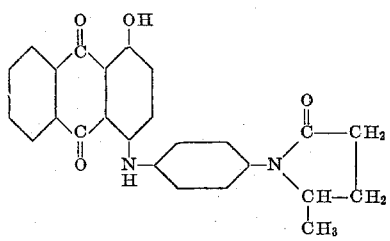

It dyes linear aromatic polyester textile materials blue shades having excellent fastness to light, washing and sublimation.

*Example 4*

Example 1 was repeated using 15.7 grams of N-(4'-amino-2'-methyl)-phenylpyrrolidone in place of N-(p-aminophenyl)pyrrolidone. The dye compound obtained has the formula:

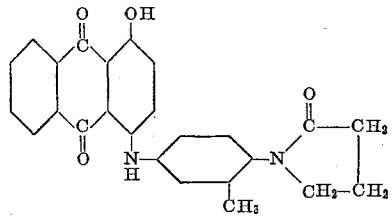

It dyes linear aromatic polyester textile materials blue shades having excellent fastness to light, washing and sublimation.

*Example 5*

Example 1 was repeated using 16.4 grams of N-(4'-amino-2'-methyl)-phenyl-5-methyl-2-pyrrolidone in place of N-(p-aminophenyl)pyrrolidone. The dye compound obtained dyes linear aromatic polyester textile materials blue shades having excellent fastness to light, washing and sublimation.

*Example 6*

Example 1 was repeated using 16.4 grams of N-(4'-amino-2',5'-dimethyl)phenyl-2-pyrrolidone in place of N-(p-aminophenyl)pyrrolidone. The dye compound obtained dyes linear aromatic polyester textile materials blue shades having excellent fastness to light, washing and sublimation.

The aminophenylpyrrolidones used in the preparation of the new anthraquinone compounds of our invention are prepared by condensing aniline or an alkyl substituted aniline compound with the appropriate γ-lactone, nitrating the N-phenylpyrrolidone compound obtained and then reducing the nitrophenylpyrrolidone compound obtained upon nitration to the corresponding aminophenylpyrrolidone compound. The following preparation for N-(p-aminophenyl)pyrrolidone is typical of the reaction conditions employed.

*Example 7*

A. 172 grams of butyrolactone and 186 grams of aniline were refluxed for 12 hours distilling off the water as formed. On standing at room temperature overnight the reaction mixture crystallized. The crystals formed were stirred for 3 hours in dilute aqueous HCl, filtered off, washed with water and dried. 225 grams of N-phenylpyrrolidone melting at 59° C. to 61° C. were thus obtained.

B. 36.75 grams of N-phenylpyrrolidone obtained in A were stirred into 75 cc. of 96% $H_2SO_4$ while keeping the temperature of the reaction mixture below 25° C. Between 8° C. and 25° C., 37.5 cc. of nitric acid (specific gravity 1.42) were added dropwise. The cooling bath was removed and after 20 minutes the reaction mixture was drowned in 600 cc. of ice and water. The crystals which precipitated were recovered by filtration, washed with water until free of acid and dried. 33 to 40 grams of N-(p-nitrophenyl)pyrrolidone melting at 121.5° C. to 123.5° C. were obtained.

C. 33.5 grams of the reaction product obtained in B in 300 cc. of ethyl alcohol were reduced with hydrogen over 5 grams of Raney nickel at 1500 p.s.i. and 100° C. until hydrogen consumption ceased. Then the Raney nickel was filtered from the hot solution and the ethyl alcohol removed by distillation. 25 grams of N-(p-aminophenyl)pyrrolidone melting at 116.5° C. to 118.5° C. were obtained.

*Example 7A*

A. 172 grams of caprolactone and 186 grams of aniline are refluxed for 12 hours distilling off the water as formed. On standing at room temperature overnight the reaction mixture crystallizes. The crystals forming are stirred for 3 hours in dilute aqueous HCl, filtered off, washed with water and dried. N-phenyl-5-ethyl-2-pyrrolidone is thus obtained.

B. 36.75 grams of N-phenyl-5-ethyl-2-pyrrolidone obtained in A are stirred into 75 cc. of 96% $H_2SO_4$ while keeping the temperature of the reaction mixture below 25° C. Between 8° C. and 25° C., 37.5 cc. of nitric acid (specific gravity 1.42) are added dropwise. The cooling bath is removed and after 20 minutes the reaction mixture is drowned in 600 cc. of ice and water. The crystals which precipitated are recovered by filtration, washed with water until free of acid and dried. N-(p-nitrophenyl)-5-ethyl-2-pyrrolidone is obtained.

C. 33.5 grams of the reaction product obtained in B in 300 cc. of ethyl alcohol are reduced with hydrogen over 5 grams of Raney nickel at 1500 p.s.i. and 100° C. until hydrogen consumption ceased. Then the Raney nickel is filtered from the hot solution and the ethyl alcohol removed by distillation. N-(p-aminophenyl)-5-ethyl-2-pyrrolidone is obtained.

Example 8

Example 7 was repeated using 214 grams of m-toluidine in place of aniline. N-(4'-amino-3'-methyl)phenylpyrrolidone melting at 83° C. to 86° C. was obtained as the final product.

Example 9

Example 7 was repeated using 200 grams of γ-valerolactone in place of γ-butyrolactone. N-(p-aminophenyl)-5-methyl-2-pyrrolidone having a melting point of 115° C. to 119° C. was obtained as the final product. The intermediate product N-(p-nitrophenyl)-5-methyl-2-pyrrolidone obtained in the course of the preparation of the desired product had a melting point of 105° C. to 110° C.

Example 10

Example 7 was repeated using 214 grams of o-toluidine in place of aniline. N-(4'-amino-2'-methyl)-phenylpyrrolidine melting at 115° C. to 120° C. was obtained as the final product.

Example 11

200 grams of γ-valerolactone and 214 grams of o-toluidine were reacted together in accordance with the procedure described in Example 7. N-(4'-amino-2'-methyl)phenyl-5-methyl-2-pyrrolidone melting at 140° C. to 145° C. was obtained as the final product. The intermediate N-(4'-nitro-2'-methyl)phenyl-5-methyl-2-pyrrolidone from which the final product is obtained by reduction of the nitro group melted at 106° C. to 110° C.

Example 12

Example 7 was repeated using 242 grams of 2,5-dimethylaniline in place of aniline. N-(4'-amino-2',5'-dimethyl)phenyl-2-pyrrolidone was obtained as the final product.

Example 13

A mixture of 10.5 grams of 1,4-dihydroxyanthraquinone, 6.5 grams of leuco 1,4-dihydroxyanthraquinone, 4 grams of boric acid, 15 grams of N-(p-aminophenyl)-5-ethyl-2-pyrrolidone and 200 cc. of isopropyl alcohol is refluxed together, with stirring, for 20 hours. The reaction mixture resulting is cooled and 100 cc. of water are added, with stirring. After one hour of stirring the solid which precipitates is recovered by filtration and washed well with water. The filter cake is reslurried in 3000 cc. of 7% aqueous sodium hydroxide and the resulting mixture is heated to boiling over a period of 40 minutes and then boiled 5 minutes. The dye compound formed is collected by filtering the hot reaction mixture and the dye cake is washed with water until the filtrate becomes colorless. The dye compound obtained has the formula:

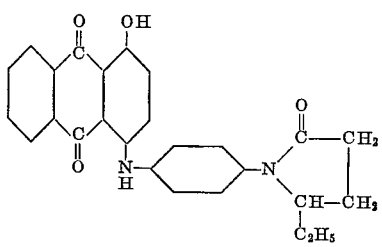

It is a blue solid having excellent affinity for linear aromatic polyester textile materials usch as polyethylene terephthalate. It dyes these textile materials blue shades having excellent fastness to light, washing and sublimation.

Example 14

Example 1 is repeated using N-(4'-amino-3'-butylphenyl)-2-pyrrolidone instead of N-(p-aminophenyl)-5-ethyl-2-pyrrolidone. The dye compound obtained has the formula:

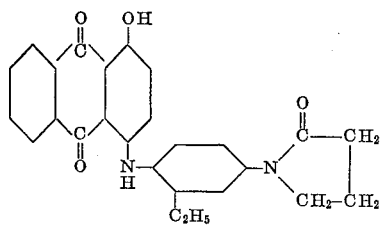

It dyes polyester textile materials blue shades which have excellent fastness to light, washing and sublimation.

In the manner of Example 7, the γ-lactones of formula

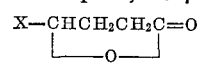

are reacted with anilines of the formula

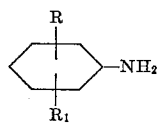

followed by nitration and reduction of the amino group to obtain pyrrolidones such as:

N-(p-aminophenyl)-5-propyl-2-pyrrolidone;
N-(4'-amino-3'-ethylphenyl)-2-pyrrolidone;
N-(4'-amino-3',6'-diethylphenyl)-2-pyrrolidone;
N-(4'-amino-3',6'-diethylphenyl)-5-ethyl-2-pyrrolidone; and
N-(4'-amino-3'-ethylphenyl)-5-ethyl-2-pyrrolidone.

These compounds are then reacted with 1,4-dihydroxy anthraquinone and leuco 1,4-dihydroxy anthraquinone as in Example 1 to obtain the new anthraquinone derivatives. The following example illustrates one satisfactory way in which polyester textile materials can be dyed with the new anthraquinone compounds of our invention.

Example 15

0.1 gram of the dye of Example 1 was dissolved in the dye pot by warming in 5 cc. of ethylene glycol monomethyl ether. A 2% Igepon T and 0.5% sodium lignin sulfonate aqueous solution was added, with stirring, until a fine emulsion was obtained. Water was then slowly added to a total volume of 200 cc. 3 cc. of Dacronyx (a chlorinated benzene emulsion) were added and 10 grams of a textile fabric made of Kodel polyester fiber were entered. The fabric was worked 10 minutes without heat and then for 10 minutes at 80° C. The dyebath was then brought to the boil and held at the boil for one hour. Following this, the fabric was rinsed in warm water, then scoured in an aqeous 0.2% soap, 0.2% soda-ash solution. After scouring, the fabric was rinsed with water and dried. The fabric was dyed a bright blue shade having excellent fastness to light, washing and sublimation.

A similar result is obtained when the fabric is made of Dacron polyester fibers.

Other dyestuff assistants (or carriers, as these assistants are sometimes called), such as o-phenylphenol, methyl salicylate and methyl terephthalate, for example, can be substituted for the chlorinated benzene emulsion employed in the foregoing example.

Example 15 is illustrative and not limitative of the manner in which polyester textile materials can be dyed. The polyester materials can also be dyed under pressure with known techniques. Further, the polyester materials can also be dyed at an elevated temperature. When dyeing is carried out at an elevated temperature it may be carried out in accordance with process described in U.S. Patent 2,663,612.

The linear aromatic polyester textile material can be in fiber, filament, yarn or cloth form, for example.

Although the invention has been described in detail with particular reference to preferred embodiments there-

What we claim is:

1. Polyester textile materials dyed with an anthraquinone compound having the formula:

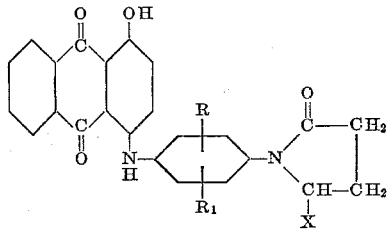

wherein R, R₁ and X each represent hydrogen or lower alkyl.

2. Linear aromatic polyester textile materials having a melting point of at least 200° C. dyed with the anthraquinone compounds defined in claim 1.

3. Polyethylene terephthalate textile materials dyed with the anthraquinone compounds defined in claim 1.

4. Polyester textile materials dyed with an anthraquinone compound having the formula:

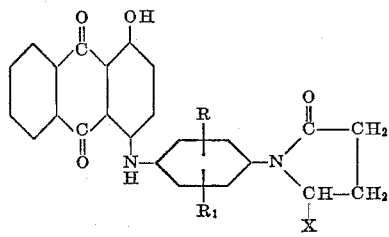

wherein R, R₁ and X each represent hydrogen or methyl.

5. Polyester textile material dyed with the compound:

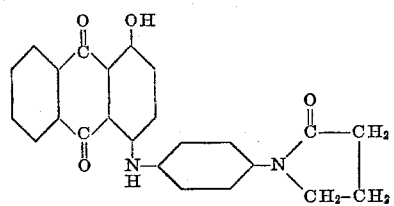

6. Polyester textile material dyed with the compound:

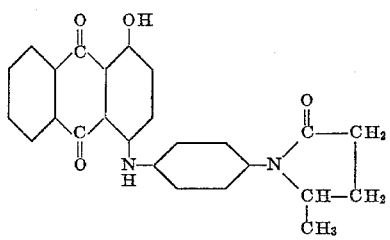

7. Polyester textile material dyed with the compound:

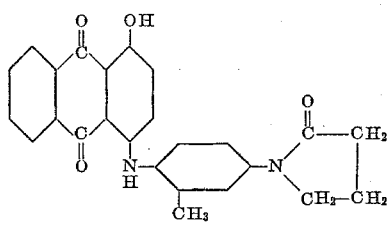

8. Polyester textile material dyed with the compound:

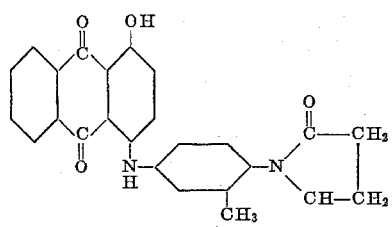

References Cited by the Examiner
UNITED STATES PATENTS

| | | | |
|---|---|---|---|
| 3,184,455 | 5/1965 | Neeff | 8—39 X |
| 3,201,415 | 8/1965 | Straley et al. | 8—39 X |

NORMAN G. TORCHIN, *Primary Examiner.*

J. HERBERT, *Assistant Examiner.*